United States Patent
Kikuchi et al.

(10) Patent No.: US 7,577,167 B2
(45) Date of Patent: Aug. 18, 2009

(54) ADAPTIVE TRANSMISSION TIMING CONTROL METHOD, WIRELESS COMMUNICATION SYSTEM AND WIRELESS COMMUNICATION DEVICE

(75) Inventors: Shingo Kikuchi, Tokyo (JP); Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 11/493,445

(22) Filed: Jul. 26, 2006

(65) Prior Publication Data
US 2007/0025326 A1 Feb. 1, 2007

(30) Foreign Application Priority Data
Jul. 29, 2005 (JP) ............................. 2005-220890

(51) Int. Cl.
*H04J 3/06* (2006.01)
(52) U.S. Cl. ....................... 370/508; 370/503; 370/520; 370/519
(58) Field of Classification Search ................ 370/508, 370/503, 520
See application file for complete search history.

(56) References Cited
U.S. PATENT DOCUMENTS 7,286,519 B2 * 10/2007 Eppinger et al. ............ 370/342

2004/0033780 A1 * 2/2004 Kelly ........................ 455/11.1
2004/0202146 A1 * 10/2004 Lee ............................. 370/350

OTHER PUBLICATIONS

Kawamura, Teruo, et al., "Adaptive Transmission Timing Control Using Reservation Packet in Reverse Link for DS-CDMA Broadband Wireless Access," Technical Report of the Institute of Electronics, Information and Communication Engineers, RCS 2003-141, pp. 13-18.

* cited by examiner

*Primary Examiner*—Rafael Pérez-Gutiérrez
*Assistant Examiner*—Issam Chakour
(74) *Attorney, Agent, or Firm*—Scully, Scott, Murphy & Presser, P.C.

(57) ABSTRACT

In a method for adaptive transmission timing control, the overlooking of a base path at the side of the base station that occurs when the transmission timing offset amount changes to the extent of falling outside the current delay-profile calculation range, and the side of the mobile station fails to demodulate the control information that contains the transmission timing offset amount, is prevented. A limit is put on the transmission timing offset amount applied in a single transmission timing control iteration. Together with setting the transmission timing offset value such that the main component of the delay profile calculated from the pilot signal transmitted with offset transmission timing falls within the time range of when the current delay profile was calculated, the time range for calculating the next delay profile is shifted such that a delay profile calculated from the pilot signal transmitted with offset transmission timing falls within the shifted range, starting at the earliest component.

18 Claims, 11 Drawing Sheets

ADAPTIVE TRANSMISSION TIMING CONTROL METHOD, WIRELESS COMMUNICATION SYSTEM AND WIRELESS COMMUNICATION DEVICE

BACKGROUND OF THE INVENTION

1. Field of the Invention

The present invention relates to wireless communication systems that perform transmission timing offset control.

2. Description of Related Art

With regard to wireless communications, it has been proposed to perform adaptive transmission timing control in order to support reception timing synchronization among mobile stations at the base station (see Technical Report of the Institute of Electronics, Information and Communication Engineers, RCS 2003-141). In a multiple-access scheme according to DS-CDMA (Direct Sequence—Code Division Multiple Access), by ensuring reception timing synchronization among mobile stations at the base station, the orthogonality of base paths among mobile stations concurrently accessing the base station can be ensured, allowing frequency utilization efficiency to be improved.

The conventional adaptive transmission timing control is explained by making reference to FIGS. 9 to 11. FIG. 9 shows an example of a delay profile at the base station for mobile station MS#1, FIG. 10 shows examples of delay-profiles for mobile stations MS#1 and MS#2 as evaluated by the base station, with FIG. 11 showing the delay profiles after timing control.

In order to perform adaptive transmission timing control, first a signal pattern previously agreed on between transmitting and receiving sides (pilot signal) is inserted by the transmitting side. The receiving side takes the convolution sum of the received signal and the pilot signal to determine the correlation electric power (delay profile) over a specific period. This specific period is referred to as delay-profile calculation range $W_1 \ldots (W_1+S)$. Again, samples lying within this range that exceed a path level threshold are called arrival paths. In the example shown in FIG. 9, Path#1, Path#2, and Path#3 are observed as arrival paths. The path having the greatest electric power level among these arrival paths, Path#2, is treated as base path. (The method of treating the path with the smallest timing, Path#1, as base path can also be considered.)

The base station calculates the greatest propagation delay time ($T_{max}$) of an arrival path and respective propagation delay times ($T_{max}-T_1$) and ($T_{max}-T_2$) of base paths $T_1$ and $T_2$ of mobile stations MS#1 and MS#2. It then appends ($T_{max}-T_1$) to control information destined for MS#1 and ($T_{max}-T_2$) to control information destined for MS#2, to communicate to each mobile station respective transmission timing offset values. Each mobile station demodulates the control information and transmits, offsetting its transmission timing by the transmission timing offset amount communicated by the base station. As shown in FIG. 11, the above actions serve to establish, at position $T_{max}$, base path timing synchronization among the mobile stations at the base station.

FIGS. 12 and 13 show an example delay profile for a case where the transmission timing offset amount changes to the extent of falling outside the current delay-profile calculation range.

For the case of the transmission timing offset amount changing to such a great extent, a method as shown in FIG. 12 can be considered in which, simultaneously with the mobile station delaying transmission timing by just $T_{max}-T_1$, the base station, too, delays the delay-profile calculation range by $T_{max}-T_1$. However, if on the side of the mobile station demodulation of the control information containing the transmission timing offset information fails, preventing the side of the mobile station from updating the transmission timing offset, the base path position remains unshifted so that, as shown in FIG. 13, solely the delay-profile calculation range at the base station is shifted, causing the base path to fall outside the delay-profile calculation range. Consequently, the path is missed at the side of the base station, and the adaptive transmission timing control breaks down.

The goal of the present invention is to provide a wireless communication system that can perform adaptive transmission timing control without overlooking of paths on the side of the base station even in the case when the transmission timing offset amount changes to the extent of falling outside the current delay-profile calculation range, and the side of the mobile station fails to demodulate the control information containing the transmission timing offset amount.

SUMMARY OF THE INVENTION

The present invention is preeminently characterized by setting an upper limit for the variation amount of the transmission timing offset at a range for which the base path does not fall outside the current delay-profile calculation range, and by afterwards letting the delay-profile calculation range follow up such that the arrival path having the smallest path timing comes to lie within a fixed interval of the delay-profile calculation range. In addition to the base path, one or more secondary base paths can be determined, and the limit set at a range for which the secondary base paths likewise do not fall outside the delay-profile calculation range.

That is to say, according to a first aspect of the present invention there is provided a method for adaptive transmission timing control, comprising transmitting a pilot signal with a predetermined signal pattern from a first wireless communication device to a second wireless communication device, furthermore by the second wireless communication device calculating as a delay profile a correlation electric power of a received signal and the pilot signal for a given time range, calculating based on this delay profile a transmission timing offset value to be set in the first wireless communication device, and communicating the transmission timing offset value to the first wireless communication device, furthermore by the first wireless communication device, in an adaptive transmission timing control method for offsetting its own transmission timing based on the transmission timing offset value communicated by the second wireless communication device, putting a limit on the transmission timing offset amount applied in a single transmission timing control iteration, furthermore by the second wireless communication device, together with setting the transmission timing offset value such that the main component of the delay profile calculated from the pilot signal transmitted with offset transmission timing falls within the time range of when the current delay profile was calculated, shifting the time range for calculating the next delay profile such that a delay profile calculated from the pilot signal transmitted with offset transmission timing falls within the shifted range, starting at the earliest component.

Preferably samples within the delay profile whose correlation electric power value exceeds a threshold are recognized as arrival paths, a single path among these arrival paths being selected as base path by a predetermined criterion, and the transmission timing offset value is set such that, of the delay profile calculated from the pilot signal transmitted with offset transmission timing, at least the base path falls within the time range of when the current delay profile was calculated, while shifting the time range for calculating the next delay profile such that the earliest arrival path of the delay profile calculated from the pilot signal transmitted with offset transmission timing falls within a prescribed interval.

Also, those among the arrival paths that exceed a predetermined threshold may be recognized as secondary base paths, and the transmission timing offset value be set such that, of the delay profile calculated from the pilot signal transmitted with offset transmission timing, the base path and the secondary base paths fall within the time range of when the current delay profile was calculated.

With the foregoing prescribed interval being a subrange of the time range for calculating the delay profile, between $B_{start}$ samples and $B_{end}$ samples from the head timing position, the time range for calculating the next delay profile can be shifted by $\gamma = B_{end} 31 B_{start} + 1$ sample units. However, $B_{start}$ and $B_{end}$ are natural numbers for which holds $B_{start} \leq B_{end}$.

Preferably the transmission timing offset value is set such that of the delay profile calculated from the pilot signal transmitted with offset transmission timing at least the base path, alternatively the base path and the secondary base paths, fall within a predetermined interval within the time range of when the current delay profile was calculated, and moreover the time position of the base path approaches an ultimately desired offset position.

The foregoing predetermined interval preferably is a range of a predetermined A samples from the head timing position of the time range for calculating the delay profile.

As base path, the one among the arrival paths that has the greatest electric power level can be used. Again, as secondary base paths, arrival paths that exceed a predetermined electric power level, or arrival paths for which the timing difference to the base path is a predetermined $\beta$ samples or less, or arrival paths that exceed a predetermined electric power level and for which moreover the timing difference to the base path is a predetermined $\beta$ samples or less can be used.

As the foregoing predetermined electric power level, an electric power level attenuated by a predetermined amount of $\alpha$ dB with respect to the base path electric power level, or an electric power level amplified by a predetermined amount $\alpha'$ dB with respect to the noise level can be used.

According to a second aspect of the present invention, there is provided a wireless communication system comprising a first wireless communication device and a second wireless communication device, the first wireless communication device comprising means for transmitting to the second wireless communication device a pilot signal with a predetermined signal pattern, the second wireless communication device comprising a delay-profile calculation part for calculating as a delay profile a correlation electric power of a received signal and the pilot signal for a given time range, a transmission timing offset amount calculation part for calculating based on this delay profile a transmission timing offset value to be set in the first wireless communication device, and means for communicating the transmission timing offset value to the first wireless communication device, the first wireless communication device further comprising an adaptive transmission timing control part for offsetting its own transmission timing based on the transmission timing offset value communicated by the second wireless communication device, the transmission timing offset amount calculation part being configured to put a limit on the transmission timing offset amount applied in a single transmission timing control iteration and to set the transmission timing offset value such that the main component of the delay profile calculated from the pilot signal transmitted with offset transmission timing falls within the time range of when the current delay profile was calculated, the second wireless communication device further comprising a delay-profile calculation range offset amount calculation part for calculating such a delay-profile calculation range offset amount that a delay profile calculated from the pilot signal transmitted with offset transmission timing falls within the offset range, starting at the earliest component, and for setting the offset range as time range for calculating the next delay profile in the delay-profile calculation part.

Preferably the second wireless communication device comprises a path detection part for estimating samples within the delay profile whose correlation electric power value exceeds a threshold to be arrival paths, and a base path detection part for selecting a single path among the estimated arrival paths as base path by a predetermined criterion, the transmission timing offset amount calculation part being configured to set the transmission timing offset value such that, of the delay profile calculated from the pilot signal transmitted with offset transmission timing, at least the base path falls within the time range of when the current delay profile was calculated, the delay-profile calculation range offset amount calculation part being configured to calculate, as offset for the time range for calculating the next delay profile, such a delay-profile calculation range offset amount that the earliest arrival path of the delay profile calculated from the pilot signal transmitted with offset transmission timing falls within a prescribed interval.

The second wireless communication device can comprise a secondary-base-path detection part for detecting as secondary base paths those among the arrival paths that exceed a predetermined threshold, and the transmission timing offset calculation part can be configured to set the transmission timing offset value such that, of the delay profile calculated from the pilot signal transmitted with offset transmission timing, the base path and the secondary base paths fall within the time range of when the current delay profile was calculated.

The second wireless communication device can be used as a base station, and the first wireless communication device can be used a mobile station communicating with the base station according to the direct spread-code division multiple access protocol.

Furthermore, according to another aspect of the present invention, there is provided a wireless communication device comprising a delay-profile calculation part for calculating as a delay profile a correlation electric power of a received signal and a pilot signal for a given time range, a transmission timing offset amount calculation part for calculating based on this delay profile a transmission timing offset value to be set in individual mobile stations, and means for communicating the transmission timing offset value to each mobile station, the transmission timing offset amount calculation part being configured to put a limit on the transmission timing offset amount applied in a single transmission timing control iteration and to set the transmission timing offset value such that the main component of the delay profile calculated from the pilot signal transmitted with offset transmission timing falls within the time range of when the current delay profile was calculated, the wireless communication device further comprising a delay-profile calculation range offset amount calculation part for calculating such a delay-profile calculation range offset amount that a delay profile calculated from the pilot signal transmitted with offset transmission timing falls within the offset range, starting at the earliest component, and for setting the offset range as time range for calculating the next delay profile in the delay-profile calculation part.

In accordance with the present invention, in a method for adaptive transmission timing control, by setting an upper limit for the transmission timing offset amount, which determines the change in a single iteration, and by offsetting the delay-profile calculation range in a follow-up of the change in transmission timing, an effect can be obtained of preventing overlooking of the base path on the base station side even in the event of having in the mobile station failed to demodulate the control information that contains the transmission timing offset amount.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
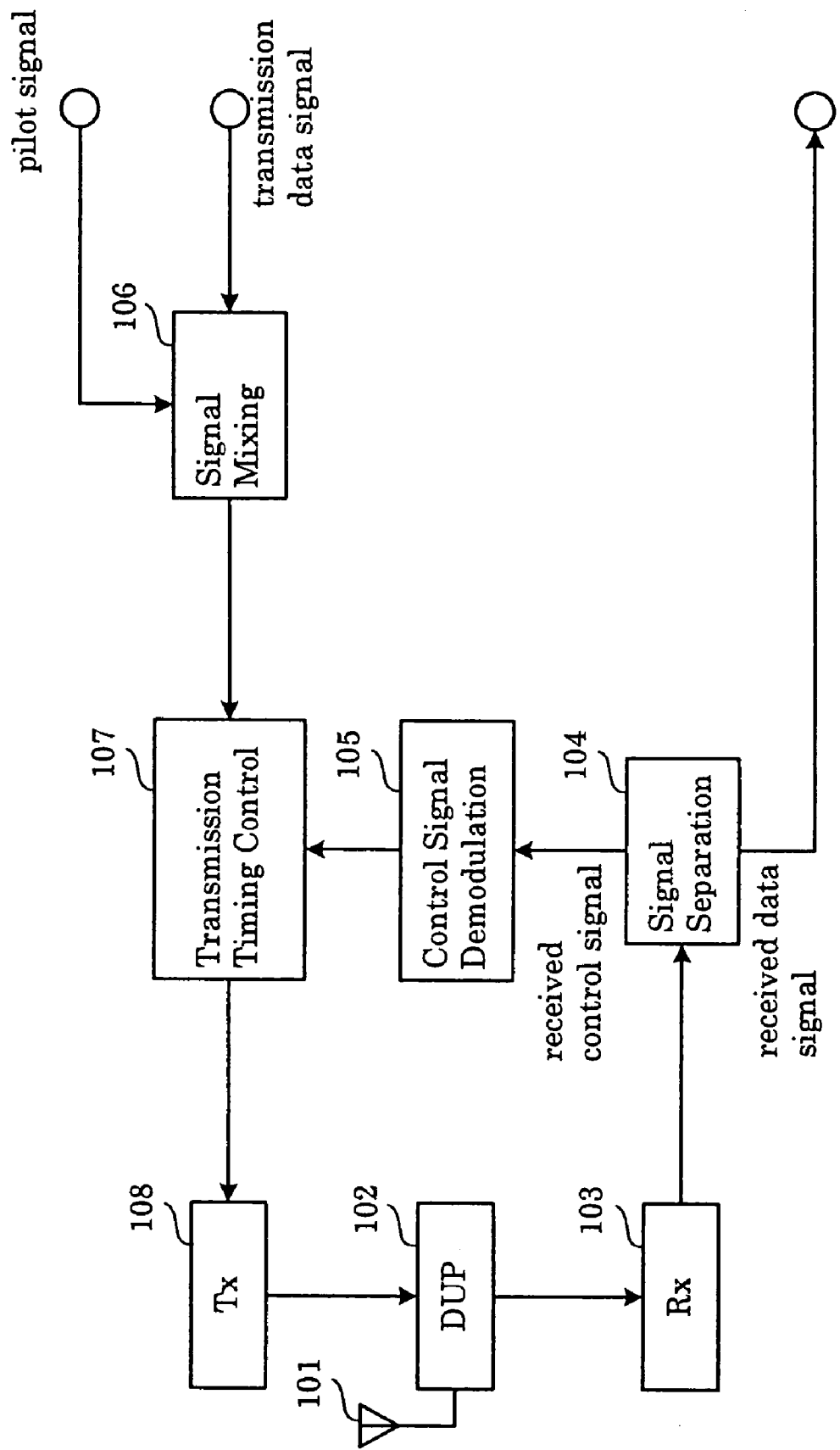
FIG. 1 is a block diagram of a first wireless communication device of a first embodiment of the present invention.
Figure 2:
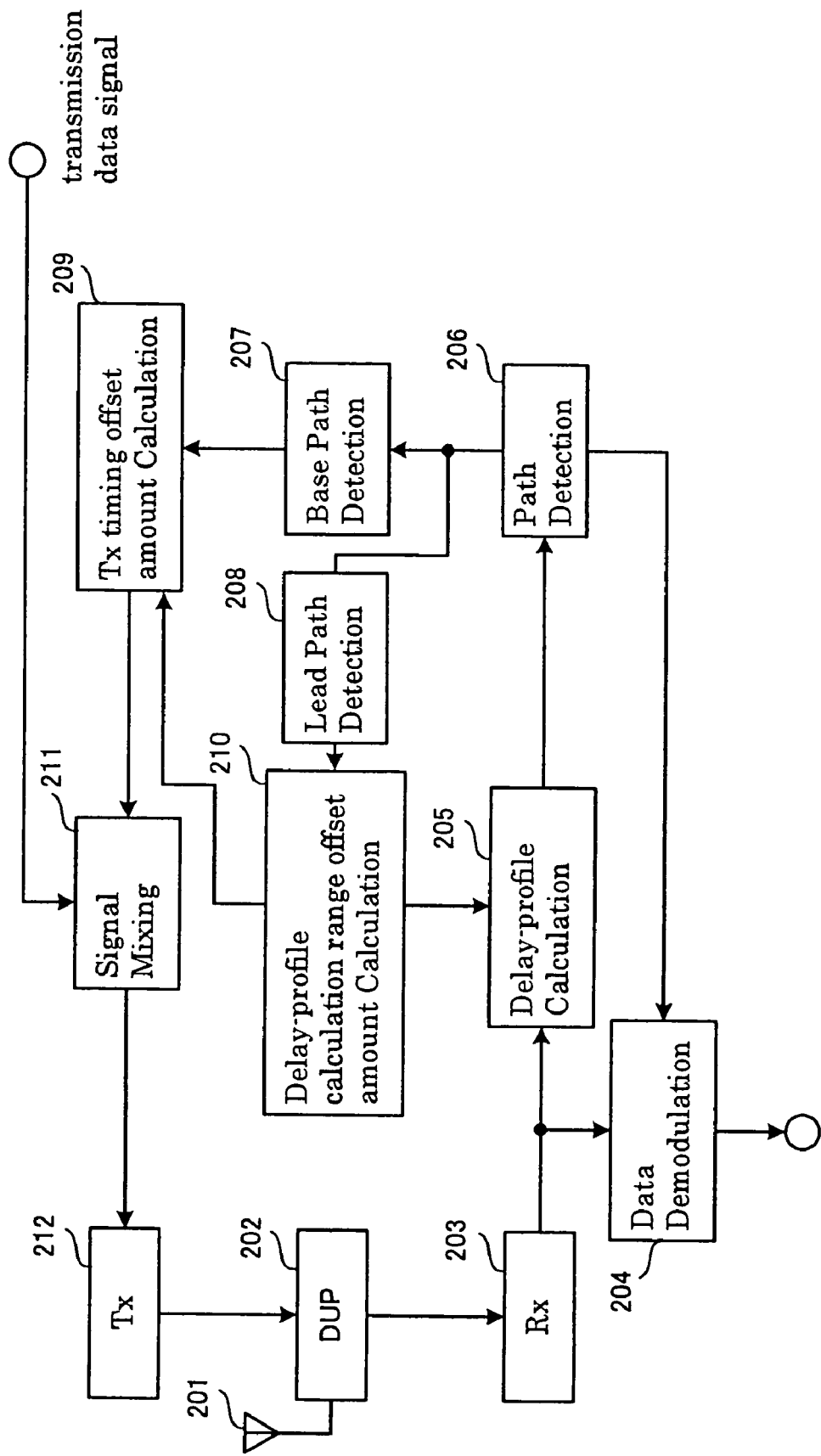
FIG. 2 is a block diagram of a second wireless communication device of a first embodiment of the present invention.

FIG. 1 and FIG. 2 are block diagrams showing a first embodiment of the present invention, respectively showing configuration examples of a first wireless communication device and a second wireless communication device.

The first wireless communication device shown in FIG. 1 is constituted by antenna 101, transmission-reception duplexer (DUP: duplexer) 102, reception part 103, signal separation part 104, control signal demodulation part 105, signal mixing part 106, transmission timing control part 107, and transmission part 108.

Reception part 103, having received a signal from the second wireless communication device via antenna 101 and transmission-reception duplexer 102, sends this signal to signal separation part 104. Signal separation part 104 separates a data signal and a control signal, and sends the control signal to control signal demodulation part 105. Control signal demodulation part 105 demodulates the control signal and sends a transmission timing offset amount contained in the demodulated control information to transmission timing control part 107. Transmission data signal and pilot signal are mixed in signal-mixing part 106, and after having delayed the signal by the transmission timing offset amount in transmission timing control part 107, are sent via transmission part 108 and transmission-reception duplexer 102 out of antenna 101 to the second wireless communication device.

The second wireless communication device shown in FIG. 2 is constituted by antenna 201, transmission-reception duplexer 202, reception part 203, data demodulation part 204, delay profile calculation part 205, path detection part 206, base path detection part 207, lead path detection part 208, transmission timing offset amount calculation part 209, delay-profile calculation range offset amount calculation part 210, signal mixing part 211, and transmission part 212.

Reception part 203, having received a signal from the first wireless communication device via antenna 201 and transmission-reception duplexer 202, sends this signal to data demodulation part 204 and delay profile calculation part 205.

Delay profile calculation part 205, with respect to the pilot signal, from a position advanced from a frame head (FH) by the value of a delay-profile calculation range offset, calculates a sliding correlation with the pilot pattern over the length of a delay profile, and converts it into electric power levels. From within the delay profile, path detection part 206 detects arrival paths exceeding a path level threshold. Data demodulation part 204 demodulates reception data based on the detected arrival paths. Base path detection part 207 selects as a base path the arrival path having the greatest electric power level (or alternatively the smallest path timing) among the arrival paths detected by path detection part 206. Lead path detection part 208 selects as a lead path the arrival path having the smallest path timing among the arrival paths detected by path detection part 206. In transmission timing offset amount calculation part 209 a transmission timing offset amount to be added to the transmission time on the next occasion in the first wireless communication device is calculated, within a range (the transmission-timing base path range) for which the base path does not lie outside the current delay-profile calculation range. In delay-profile calculation range offset amount calculation part 210 it is determined whether the lead path lies within a certain location (the delay-profile lead path range) of a delay-profile calculation interval (S+1). If the lead path does not lie within the delay-profile lead path range, the delay-profile calculation range offset is adjusted and updated so that the lead path comes to lie within the delay-profile lead path range.

In signal mixing part 211 transmission data signal and the transmission timing offset amount (control information) are mixed, and sent via transmission part 212 and transmission-reception duplexer 202 out of antenna 201 to the first wireless communication device.

Figure 3:
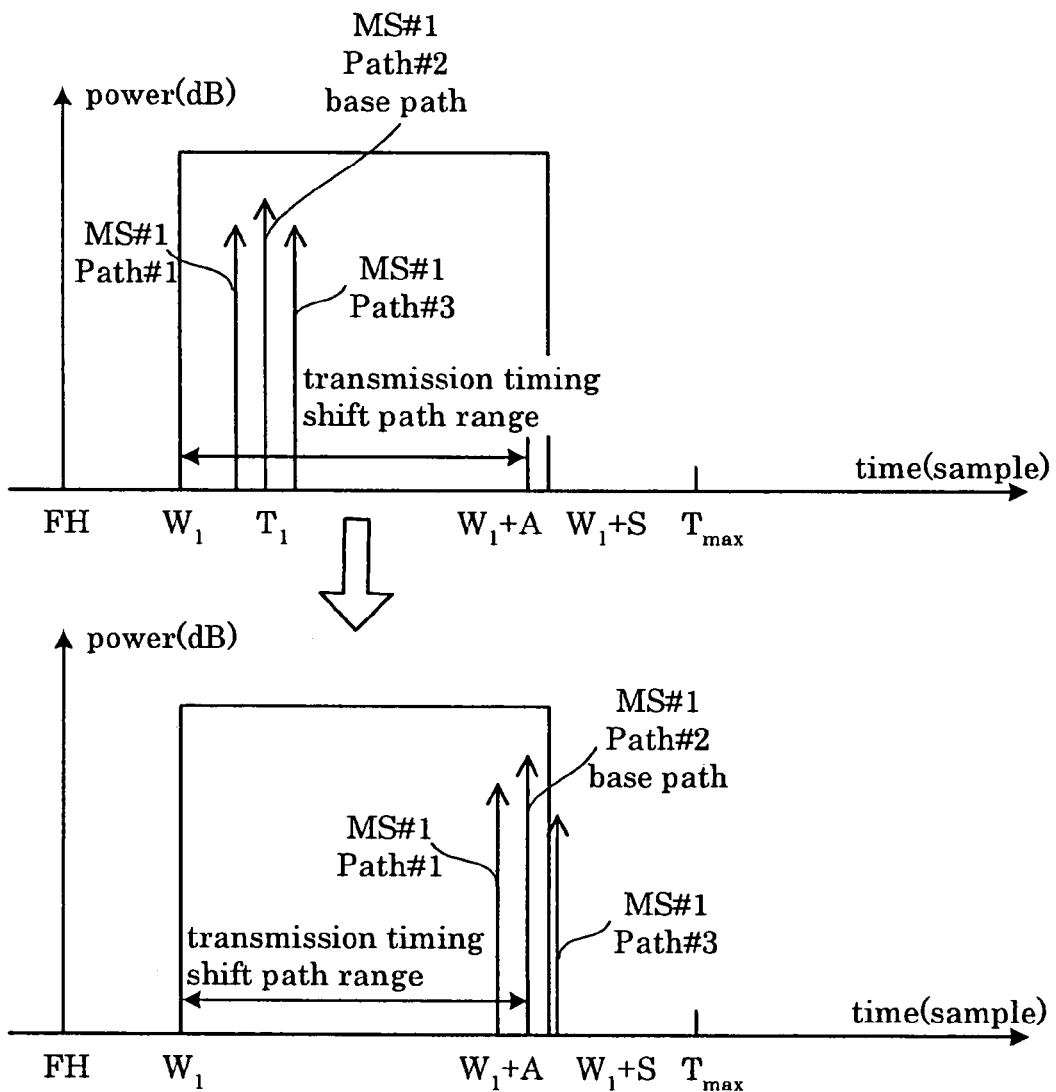
FIG. 3 is an explanatory diagram of the action of a transmission timing offset amount calculation part.

FIG. 3 is a diagram explaining the action of transmission timing offset amount calculation part 209 shown in FIG. 2. In timing offset amount calculation part 209, treating as upper limit a value for which base path Path#2 falls into between the head position of the delay-profile calculation range and sample A (the transmission-timing shift path range), the transmission timing offset amount is adjusted such that the base path approaches base path synchronous timing position $T_{max}$. In FIG. 3, A is added to the current transmission timing offset amount, adjusting it such that base path Path#2 moves toward the end of the transmission timing-shift path range. While convergence toward $T_{max}$ becomes faster as A is set closer to the length of the delay-profile calculation range, there is a possibility that the base path may fall outside the delay-profile calculation range as the base path timing value increases when the user moves away from the base station. While convergence toward $T_{max}$ becomes slower as A is set lower, the possibility that the base path may fall outside the delay-profile calculation range is decreased, even in the case of the base path timing value increasing when the user moves away from the base station. Furthermore, the probability of paths other than the base path also falling within the search window rises, and a characteristics improvement effect can be expected from utilizing multipath until convergence toward $T_{max}$.

Figure 4:
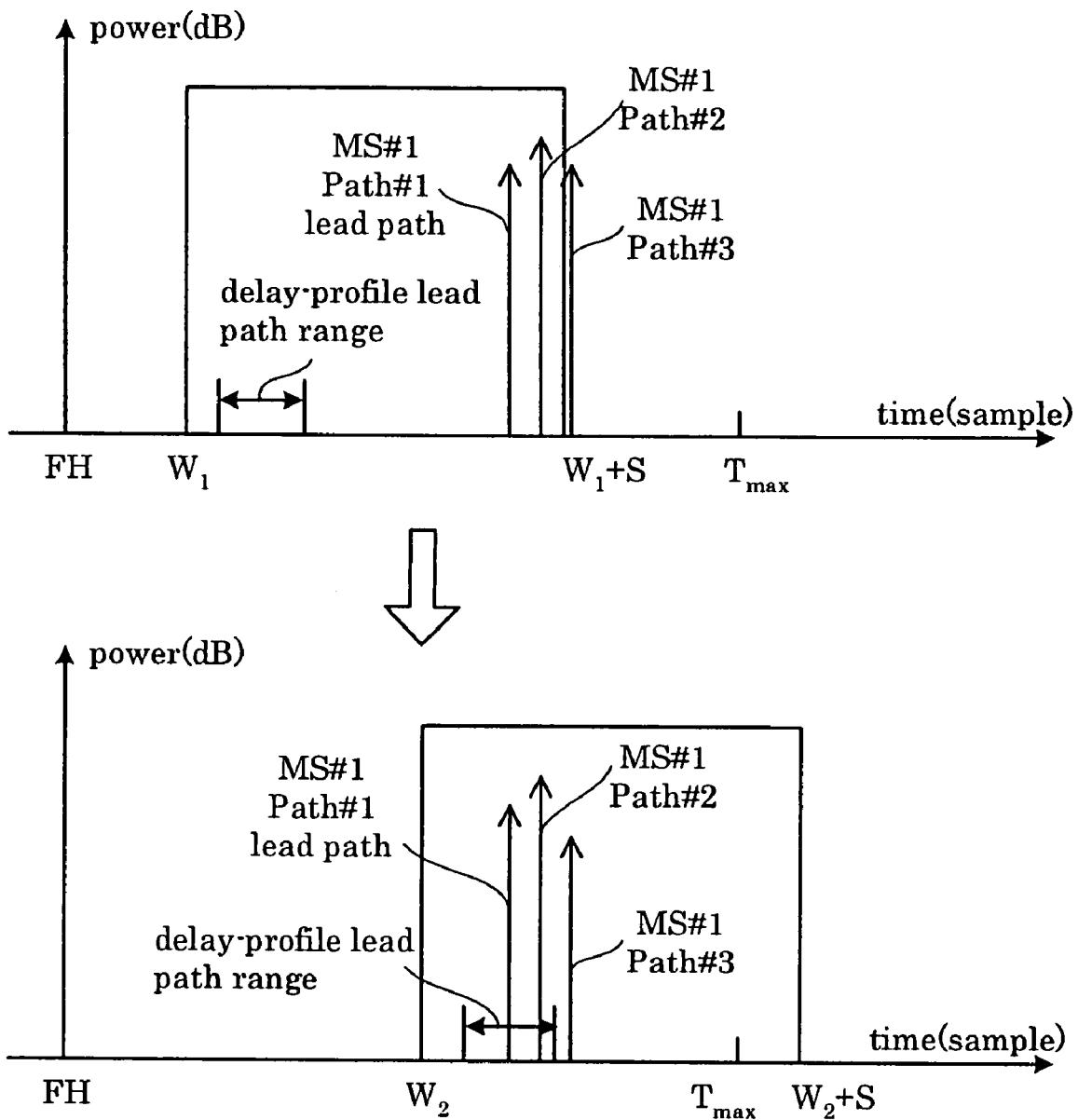
FIG. 4 is an explanatory diagram of the action of a delay-profile calculation range offset amount calculation part.
Figure 5:
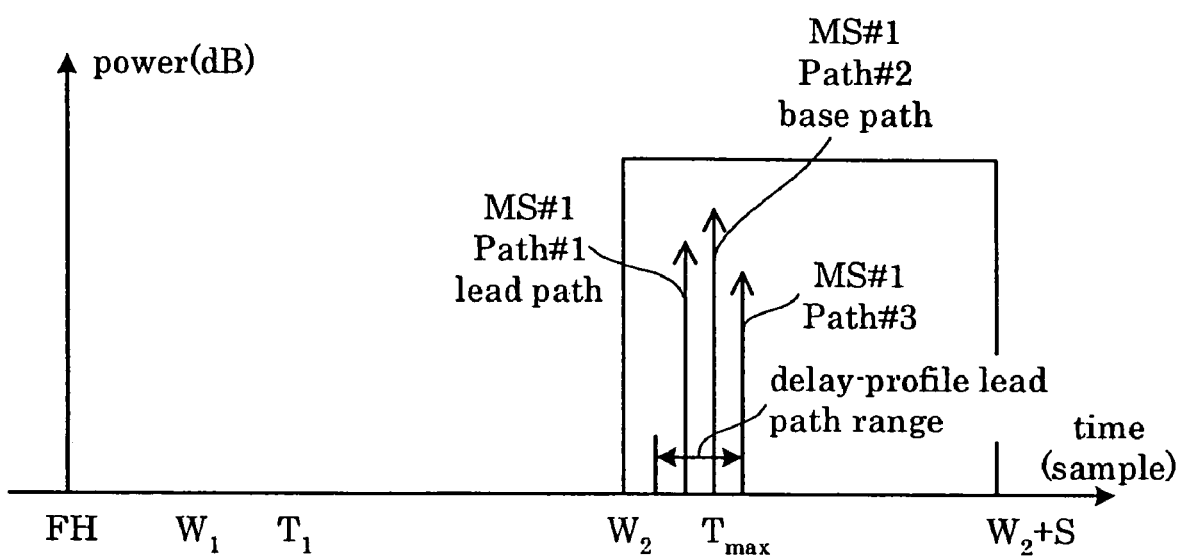
FIG. 5 is a diagram explaining the stationary state of transmission timing control.

FIG. 4 is a diagram explaining the action of the delay-profile calculation range offset amount calculation part 210 shown in FIG. 2. The delay-profile lead path range is fixed at a certain location of the delay-profile calculation interval (S+1). If Path#1, which is the arrival path having the smallest timing (lead path), does not lie within the delay-profile lead path range, the delay-profile calculation range offset amount is updated such that Path#1 falls within the delay-profile lead path range. In FIG. 4, Path#1 is brought to lie within the delay-profile lead path range by updating the delay-profile calculation range offset amount from W1 to W2. When denoting by sample $B_{start}$ the start position of the delay-profile base path range with respect to the delay-profile calculation interval start position, by sample $B_{end}$ the end position of the delay-profile lead path range with respect to the start timing position of the delay-profile calculation interval, and by sample γ the units of adjustment of the delay-profile calculation range offset amount, setting $B_{start}$, $B_{end}$, and γ such that the relation $γ=(B_{end}-B_{start}+1)$ is fulfilled uniquely determines an amount of adjustment of the delay-profile calculation range offset amount for which the lead path falls within the delay-profile lead path range. Note, however, that $B_{start}$ and $B_{end}$ are natural numbers for which holds $B_{start} \leq B_{end}$. Control is such that in the end, as shown in FIG. 5, the lead path lies within the delay-profile lead path range while the base path reaches the synchronous timing position $T_{max}$.

Detailed explanation of data demodulation part 204 and delay-profile calculation part 205 is omitted because these can be implemented using general DS-CDMA designs.

By the above actions, it is possible to prevent the overlooking of the base path that occurs in the event of demodulating with incorrect transmission timing offset on the side of the mobile station.

Figure 6:
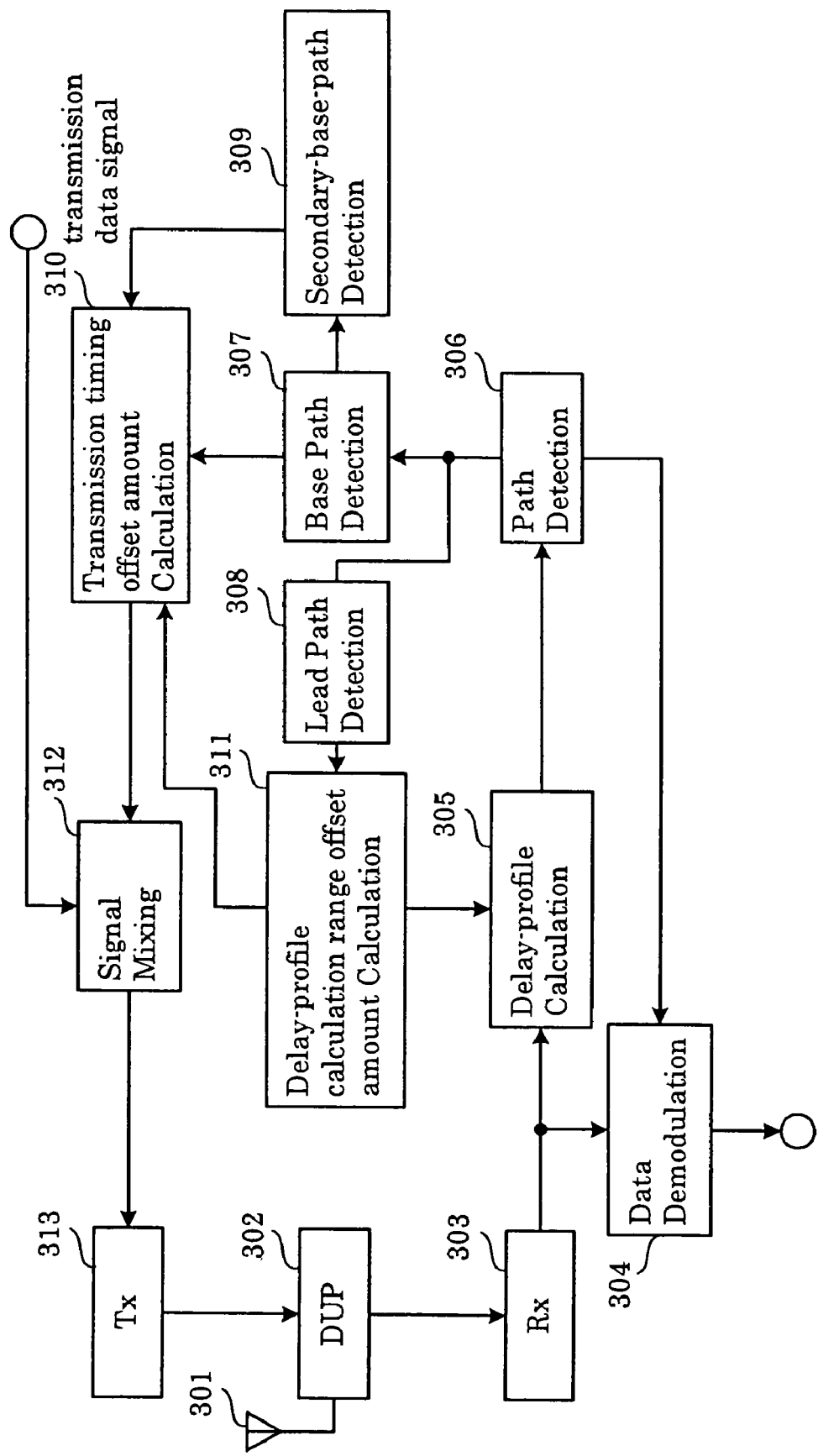
FIG. 6 is a block diagram of a second wireless communication device of a second embodiment of the present invention.

FIG. 6 is a block diagram of a second wireless communication device from a second embodiment of the present invention. The composition of a first wireless communication device is the same as in the first embodiment.

This wireless communication device is constituted by antenna 301, transmission-reception duplexer 302, reception part 303, data demodulation part 304, delay-profile calculation part 305, path detection part 306, base path detection part 307, lead path detection part 308, secondary-base-path detection part 309, transmission timing offset amount calculation part 310, delay-profile calculation range offset amount calculation part 311, signal mixing part 312, and transmission part 313. The differences of the second wireless communication device of the present embodiment from the second wireless communication device in the first embodiment are the addition of secondary-base-path detection part 309, and the action of transmission timing offset amount calculation part 310. These will be explained below.

Figure 7:
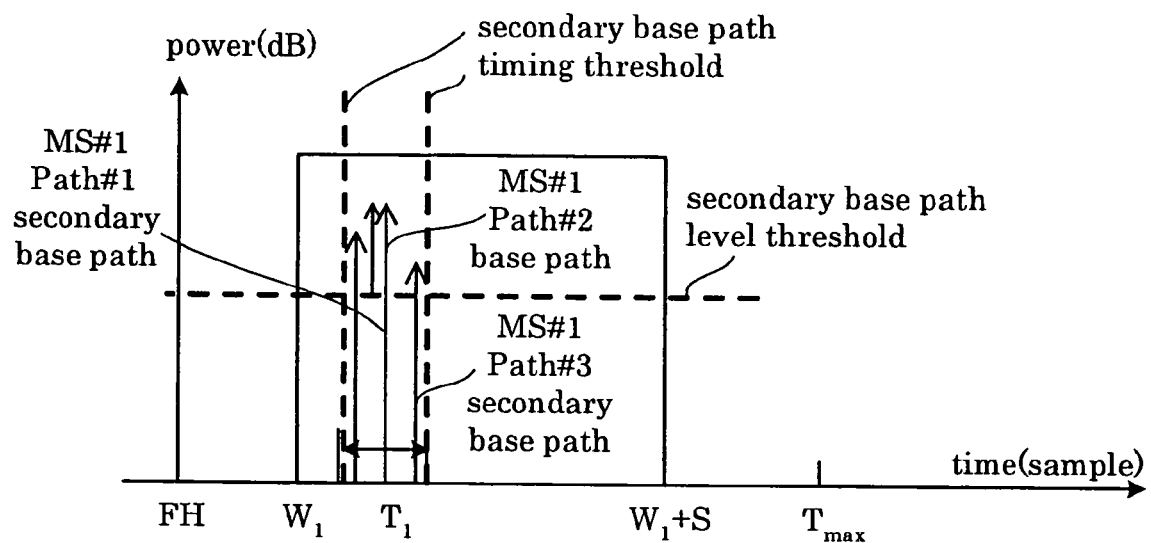
FIG. 7 is a diagram explaining the action of a secondary-base-path detection part.

The action of secondary-base-path detection part 309 shown in FIG. 6 is explained by making use of FIG. 7. In secondary-base-path detection part 309, paths that clear secondary-base-path thresholds are selected as secondary base paths from among the arrival paths detected by path detection part 306. Two kinds of secondary-base-path thresholds, a secondary-base-path level threshold and a secondary-base-path timing threshold, are set, and arrival paths apart from the base path whose electric power is above the secondary-base-path level threshold, and whose timing difference to the base path is below the secondary-base-path timing threshold are selected as secondary base paths. For the secondary-base-path level threshold is used either a method of setting the level position at an electric power attenuation amount α dB from the base path, or a method of setting the level position at an amplification amount α' dB from the noise level. As a way of calculating the noise level, a method using an average of the electric power in the delay-profile calculation interval excluding the arrival paths can be considered. For the secondary-base-path timing threshold, the timing position is set ±β samples from the base path timing. In FIG. 7, Path#1 and Path#3, having cleared both the secondary-base-path level threshold and the secondary-base-path timing threshold, are determined as secondary base paths.

Figure 8:
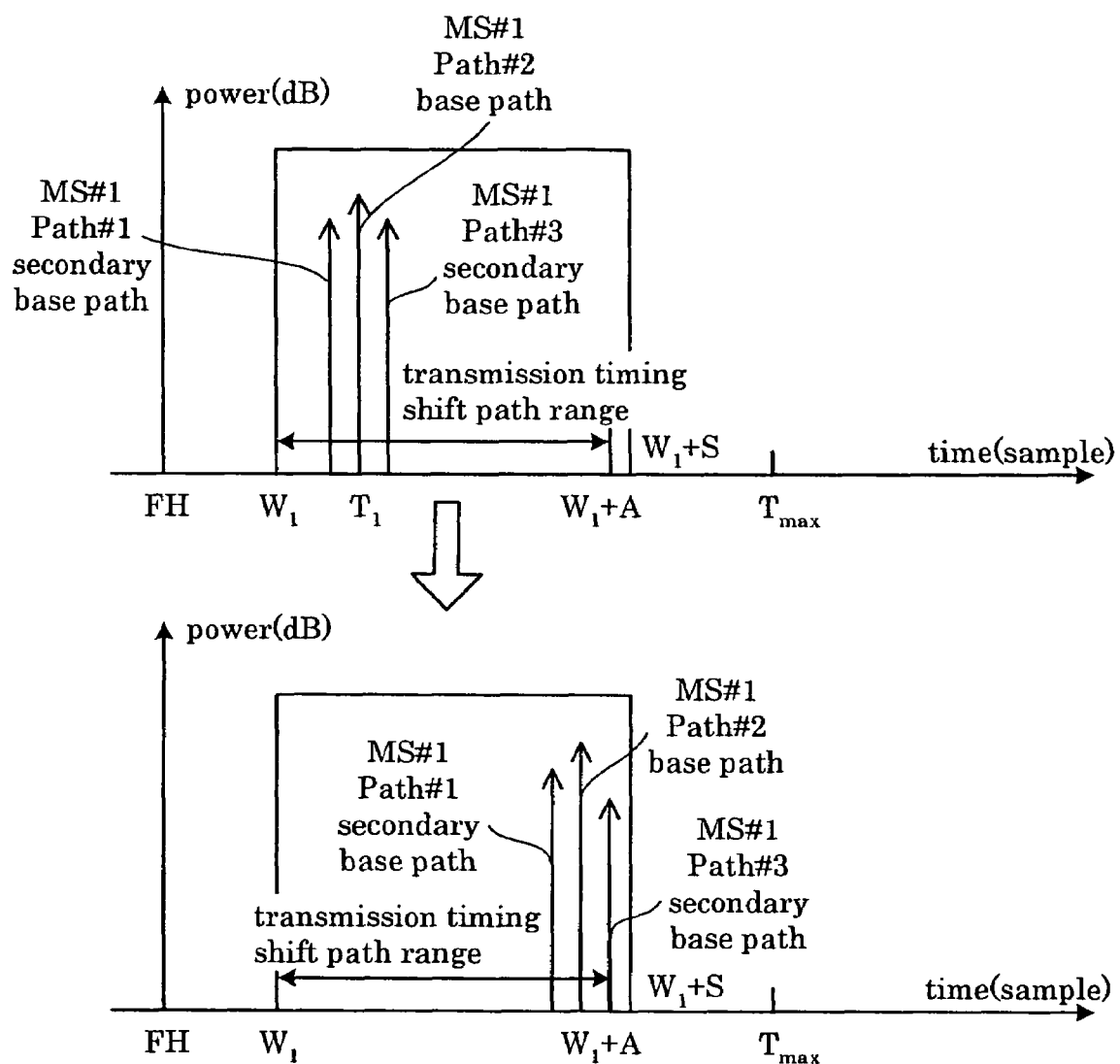
FIG. 8 is a diagram explaining the action of a transmission timing offset amount calculation part.
Figure 9:
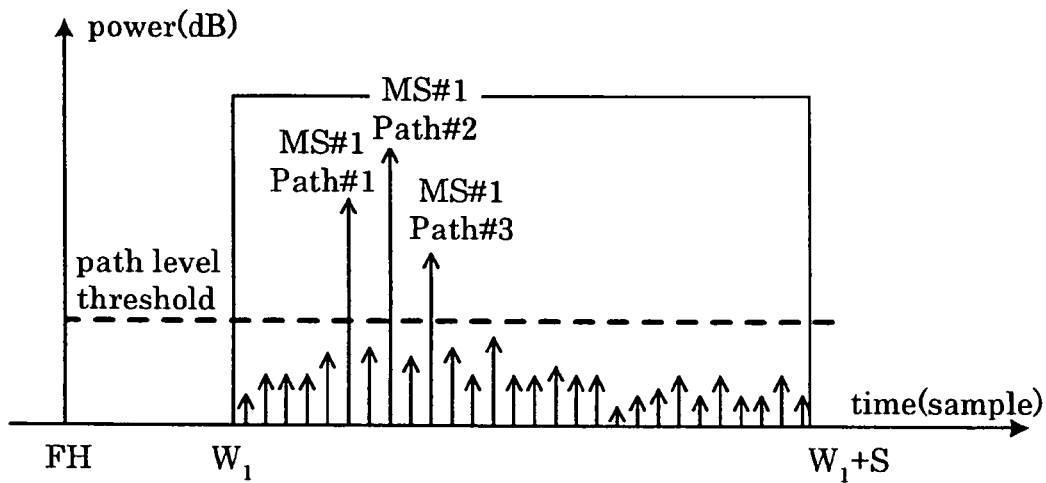
FIG. 9 is a diagram for the purpose of explaining a delay profile.
Figure 10:
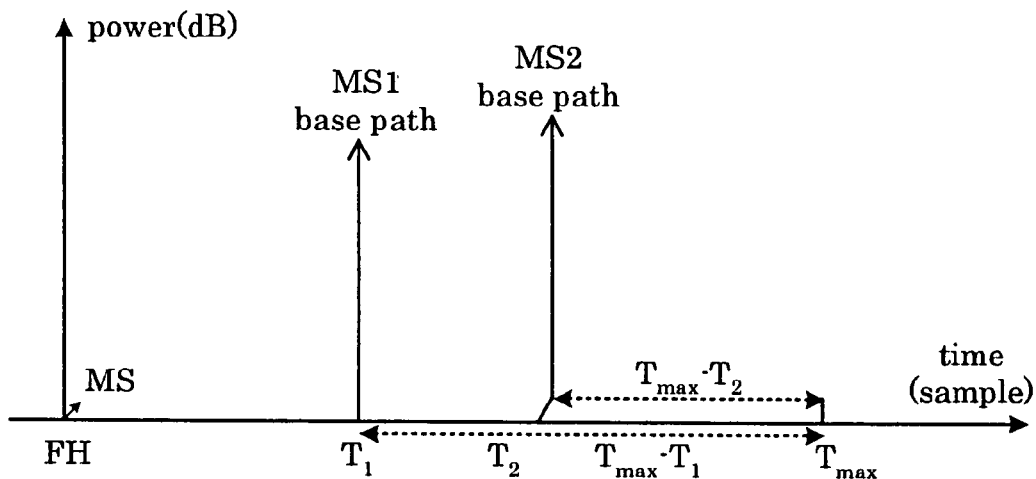
FIG. 10 is a diagram explaining a conventional adaptive transmission timing control method.
Figure 11:
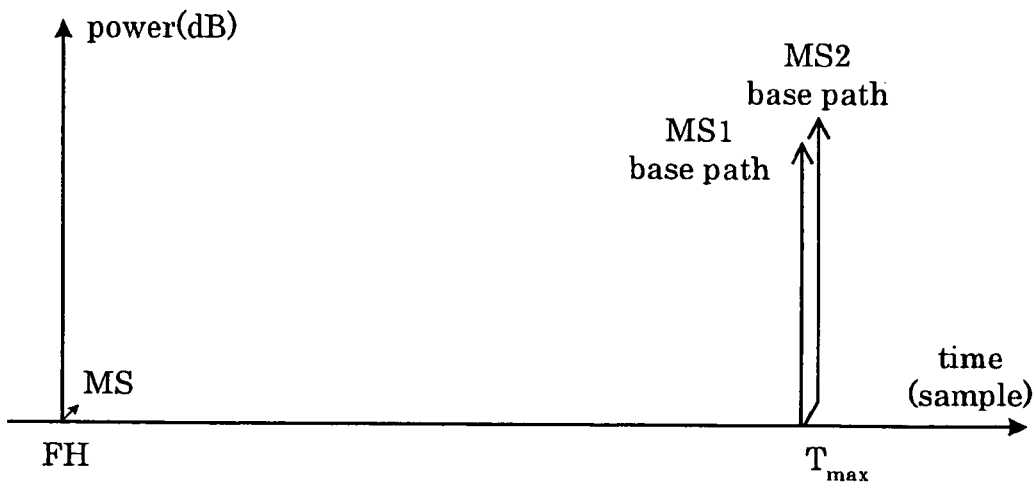
FIG. 11 is a diagram explaining a conventional adaptive transmission timing control method.
Figure 12:
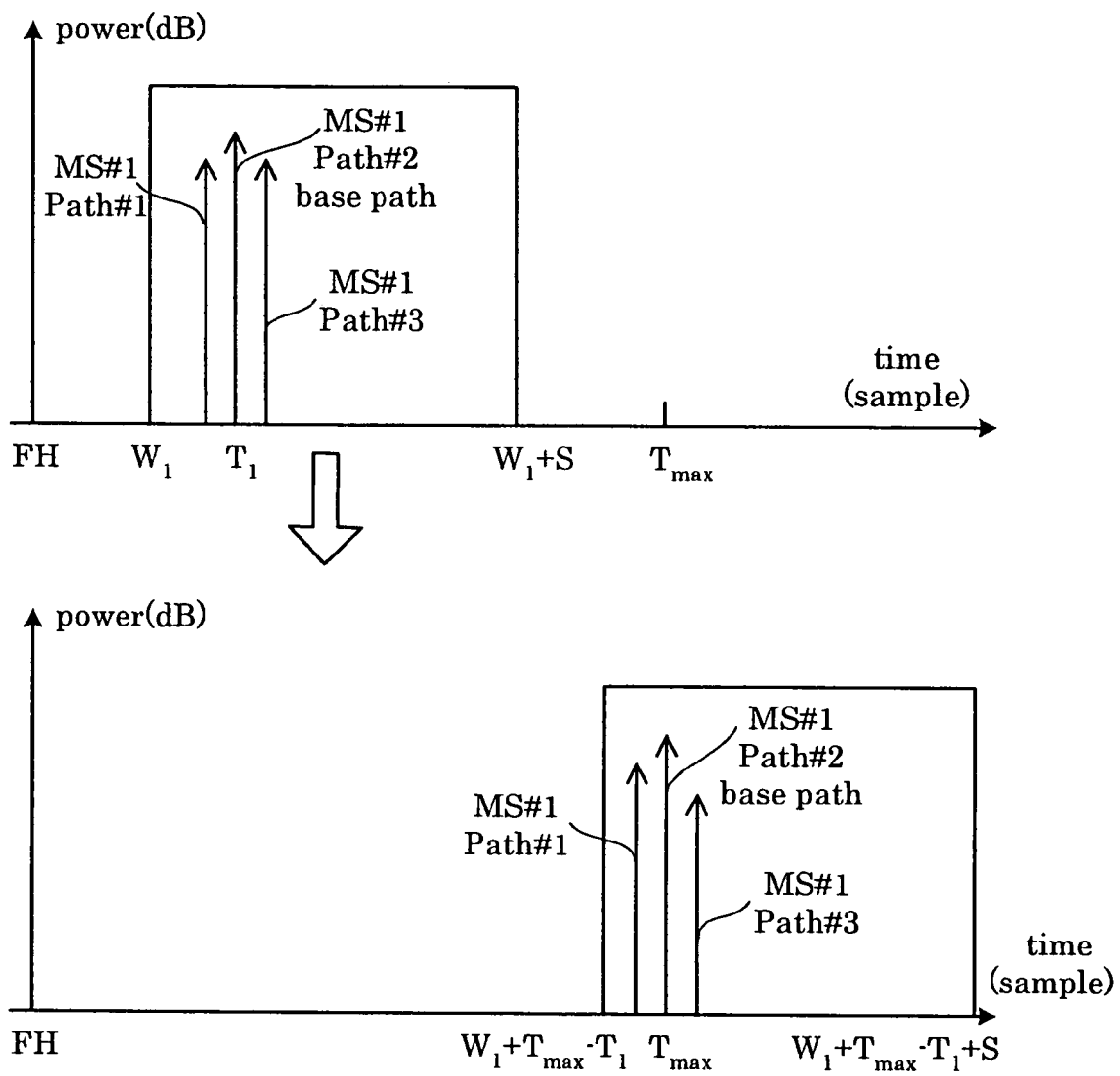
FIG. 12 is a diagram explaining the problem attempted to be solved by the present invention.
Figure 13:
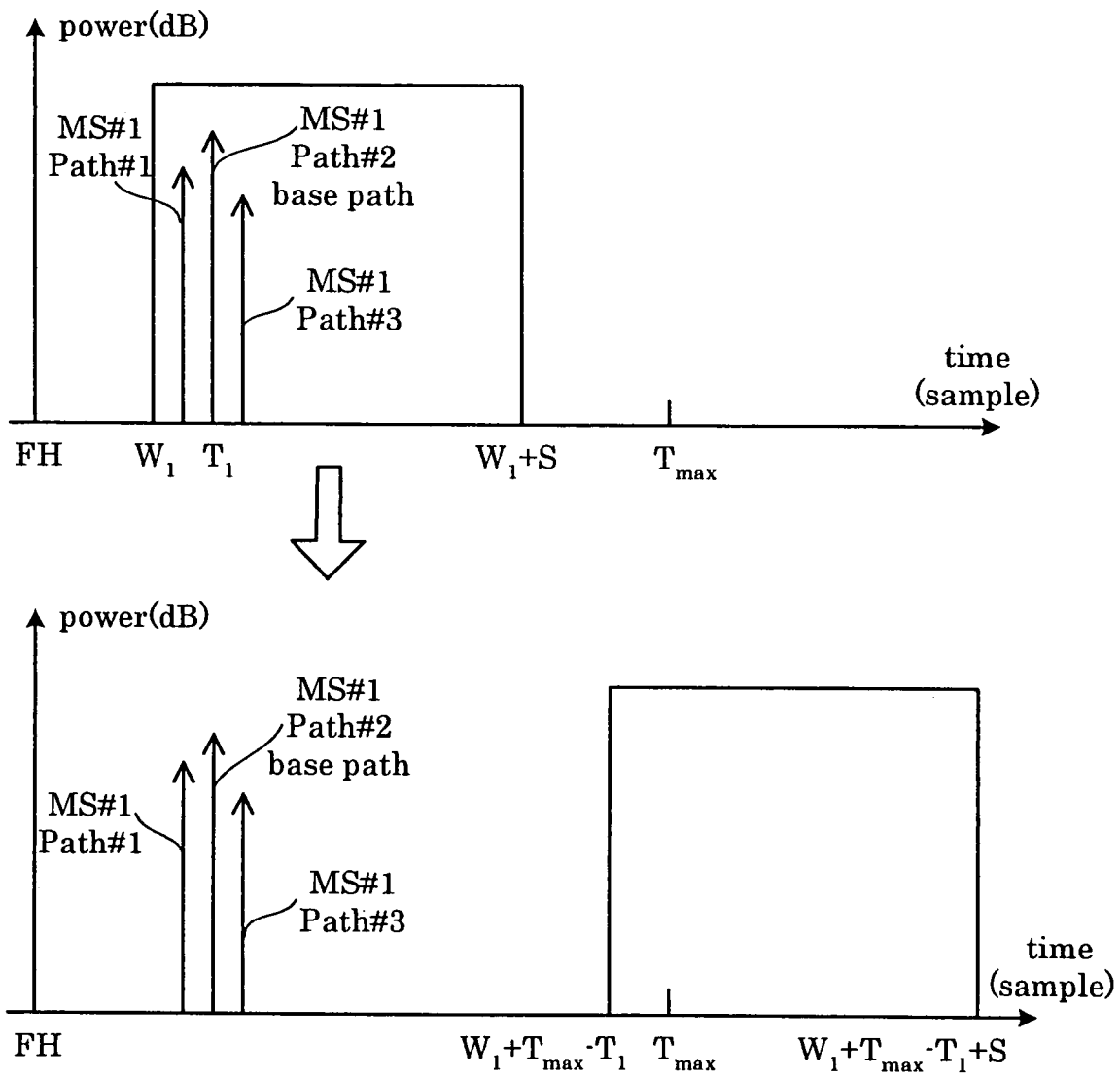
FIG. 13 is a diagram explaining the problem attempted to be solved by the present invention.

FIG. 8 is a diagram explaining the action of transmission timing offset amount calculation part 310 shown in FIG. 6. In transmission timing offset amount calculation part 310, treating as upper limit a value for which the base path and the secondary base paths fall into the transmission-timing shift path range, the transmission timing offset amount is calculated such that the base path approaches $T_{max}$. In FIG. 8, A is added to the current transmission timing offset amount, adjusting it such that secondary base path Path#3 moves toward the end of the transmission timing-shift path range.

In the second embodiment, in addition to the base path also secondary base paths close to the base path in level and timing fall within the delay-profile calculation range, leading to an improvement of the error rate.

What is claimed is:

1. A method for adaptive transmission timing control, comprising:

transmitting a pilot signal with a predetermined signal pattern from a first wireless communication device to a second wireless communication device, by the second wireless communication device, calculating as a delay profile a correlation electric power of a received signal and the pilot signal for a given time range, calculating based on this delay profile a transmission timing offset value to be set in the first wireless communication device, and communicating the transmission timing offset value to the first wireless communication device, by the first wireless communication device, offsetting its own transmission timing based on the transmission timing offset value communicated by the second wireless communication device, wherein a limit is put on the transmission timing offset amount applied in a single transmission timing control iteration, and the second wireless communication device, along with setting the transmission timing offset value such that the main component of the delay profile calculated from the pilot signal transmitted with offset transmission timing falls within the time range of when the current delay profile was calculated, shifts the time range for calculating the next delay profile such that a delay profile calculated from the pilot signal transmitted with offset transmission timing falls within the shifted range, starting at the earliest component.

2. The method for adaptive transmission timing control according to claim 1, wherein samples within the delay profile whose correlation electric power value exceeds a threshold are recognized as arrival paths, a single path among these arrival paths being selected as base path by a predetermined criterion, and the transmission timing offset value is set such that, of the delay profile calculated from the pilot signal transmitted with offset transmission timing, at least the base path falls within the time range of when the current delay profile was calculated, while shifting the time range for calculating the next delay profile such that the earliest arrival path of the delay profile calculated from the pilot signal transmitted with offset transmission timing falls within a prescribed interval.

3. The method for adaptive transmission timing control according to claim 2, wherein the prescribed interval is a subrange of the time range for calculating the delay profile, between $B_{start}$ samples and $B_{end}$ samples from the head timing position, and the time range for calculating the next delay profile is shifted by $\gamma = B_{end} - B_{start} + 1$ sample units, $B_{start}$ and $B_{end}$ being natural numbers for which holds $B_{start} \leq B_{end}$.

4. The method for adaptive transmission timing control according to claim 2, wherein the transmission timing offset value is set such that, of the delay profile calculated from the pilot signal transmitted with offset transmission timing, at least the base path falls within a predetermined interval within the time range of when the current delay profile was calculated, and moreover the time position of the base path approaches an ultimately desired offset position.

5. The method for adaptive transmission timing control according to claim 2, wherein the one among the arrival paths that has the greatest electric power level is recognized as base path.

6. The method for adaptive transmission timing control according to claim 2, wherein those among the arrival paths that exceed a predetermined threshold are recognized as secondary base paths, and the transmission timing offset value is set such that, of the delay profile calculated from the pilot signal transmitted with offset transmission timing, the base path and the secondary base paths fall within the time range of when the current delay profile was calculated.

7. The method for adaptive transmission timing control according to claim 6, wherein the transmission timing offset value is set such that, of the delay profile calculated from the pilot signal transmitted with offset transmission timing, the base path and the secondary base paths fall within a predetermined interval within the time range of when the current delay profile was calculated, and moreover the time position of the base path approaches an ultimately desired offset position.

8. The method for adaptive transmission timing control according to claim 4 or 7, wherein the predetermined interval is a range of a predetermined A samples from the head timing position of the time range for calculating the delay profile, A being a natural number.

9. The method for adaptive transmission timing control according to claim 6, wherein the one among the arrival paths that has the greatest electric power level is recognized as base path, and arrival paths that exceed a predetermined electric power level are recognized as secondary base paths.

10. The method for adaptive transmission timing control according to claim 6, wherein arrival paths for which the timing difference to the base path is a predetermined β samples or less are recognized as secondary base paths.

11. The method for adaptive transmission timing control according to claim 6, wherein the one among the arrival paths that has the greatest electric power level is recognized as base path, and arrival paths that exceed a predetermined electric power level and for which moreover the timing difference to the base path is a predetermined β samples or less are recognized as secondary base paths.

12. The method for adaptive transmission timing control according to claim 9 or 11, wherein as the predetermined electric power level, an electric power level attenuated by a predetermined amount of α dB with respect to the base path electric power level is used.

13. The method for adaptive transmission timing control according to claim 9 or 11, wherein as the predetermined electric power level, an electric power level amplified by a predetermined amount of α' dB with respect to a noise level is used.

14. A wireless communication system comprising a first wireless communication device and a second wireless communication device, the first wireless communication device comprising means for transmitting to the second wireless communication device a pilot signal with a predetermined signal pattern, the second wireless communication device comprising a delay-profile calculation part for calculating as a delay profile a correlation electric power of a received signal and the pilot signal for a given time range, a transmission timing offset amount calculation part for calculating based on this delay profile a transmission timing offset value to be set in the first wireless communication device, and means for communicating the transmission timing offset value to the first wireless communication device, the first wireless communication device further comprising a transmission timing control part for offsetting its own transmission timing based on the transmission timing offset value communicated by the second wireless communication device, wherein the transmission timing offset amount calculation part is configured to put a limit on the transmission timing offset amount applied in a single transmission timing control iteration and to set the transmission timing offset value such that the main component of the delay profile calculated from the pilot signal transmitted with offset transmission timing falls within the time range of when the current delay profile was calculated, and the second wireless communication device further comprises a delay-profile calculation range offset amount calculation part for calculating such a delay-profile calculation range offset amount that a delay profile calculated from the pilot signal transmitted with offset transmission timing falls within the offset range, starting at the earliest component, and for setting the offset range as time range for calculating the next delay profile in the delay-profile calculation part.

15. The wireless communication system according to claim 14, wherein:

the second wireless communication device comprises a path detection part for estimating samples within the delay profile whose correlation electric power value exceeds a threshold to be arrival paths, and a base path detection part for selecting a single path among the estimated arrival paths as base path by a predetermined criterion, the transmission timing offset amount calculation part is configured to set the transmission timing offset value such that, of the delay profile calculated from the pilot signal transmitted with offset transmission timing, at least the base path falls within the time range of when the current delay profile was calculated, and the delay-profile calculation range offset amount calculation part is configured to calculate, as offset for the time range for calculating the next delay profile, such a delay-profile calculation range offset amount that the earliest arrival path of the delay profile calculated from the pilot signal transmitted with offset transmission timing falls within a prescribed interval.

16. The wireless communication system according to claim 15, wherein the second wireless communication device comprises a secondary-base-path detection part for detecting as secondary base paths those among the arrival paths that exceed a predetermined threshold, and the transmission timing offset calculation part is configured to set the transmission timing offset value such that, of the delay profile calculated from the pilot signal transmitted with offset transmission timing, the base path and the secondary base paths fall within the time range of when the current delay profile was calculated.

17. The wireless communication system according to any one of claim 14 to 16, wherein the second wireless communication device is a base station, and the first wireless communication device is a mobile station communicating with the base station according to the direct spread-code division multiple access protocol.

18. A wireless communication device comprising:

a delay-profile calculation part for calculating as a delay profile a correlation electric power of a received signal and a pilot signal for a given time range, a transmission timing offset amount calculation part for calculating based on this delay profile a transmission timing offset value to be set in individual mobile stations, and means for communicating the transmission timing offset value to each mobile station, wherein the transmission timing offset amount calculation part is configured to put a limit on the transmission timing offset amount applied in a single transmission timing control iteration and to set the transmission timing offset value such that the main component of the delay profile calculated from the pilot signal transmitted with offset transmission timing falls within the time range of when the current delay profile was calculated, and the wireless communication device further comprises a delay-profile calculation range offset amount calculation part for calculating such a delay-profile calculation range offset amount that a delay profile calculated from the pilot signal transmitted with offset transmission timing falls within the offset range, starting at the earliest component, and for setting the offset range as time range for calculating the next delay profile in the delay-profile calculation part.

* * * * *